July 16, 1940.  A. F. GREINER  2,207,980
UNIVERSAL JOINT
Filed July 31, 1937  2 Sheets-Sheet 1
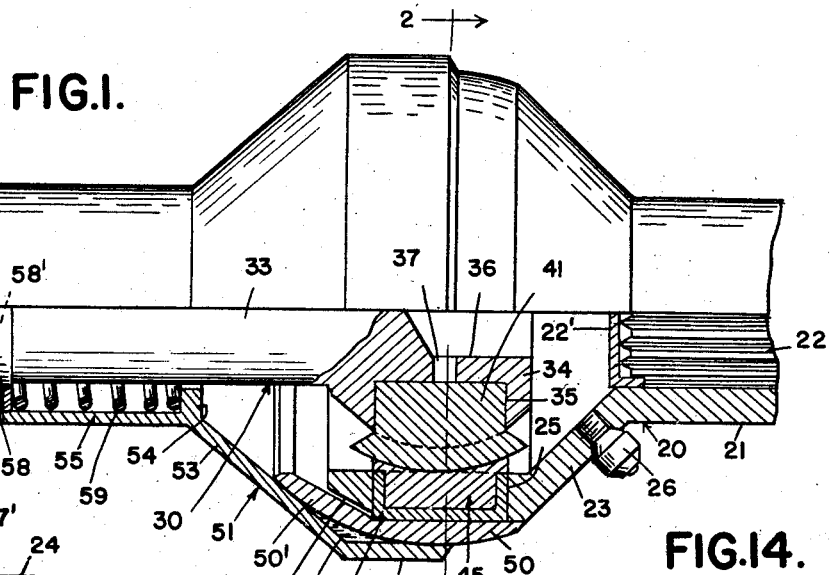
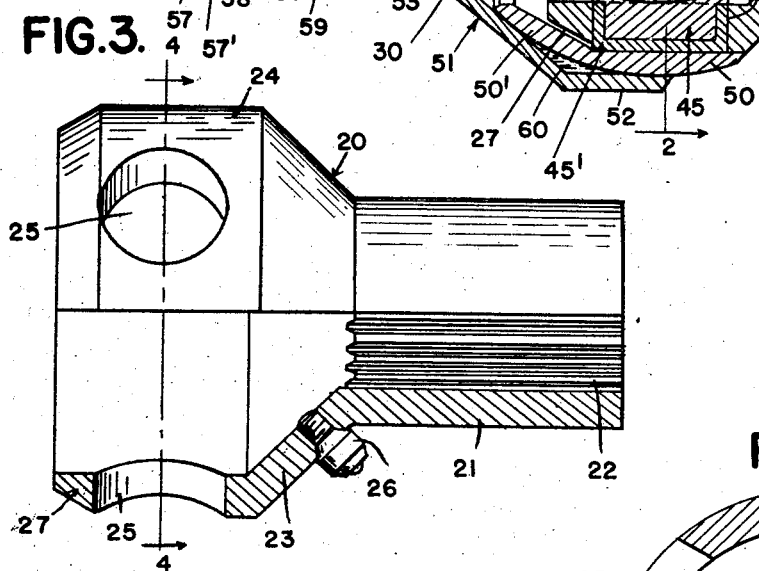
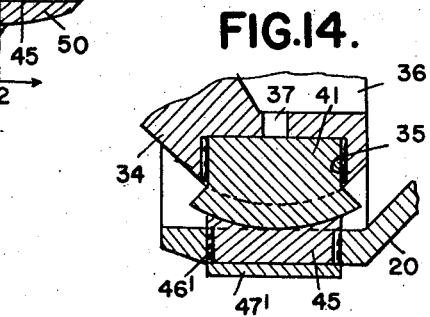
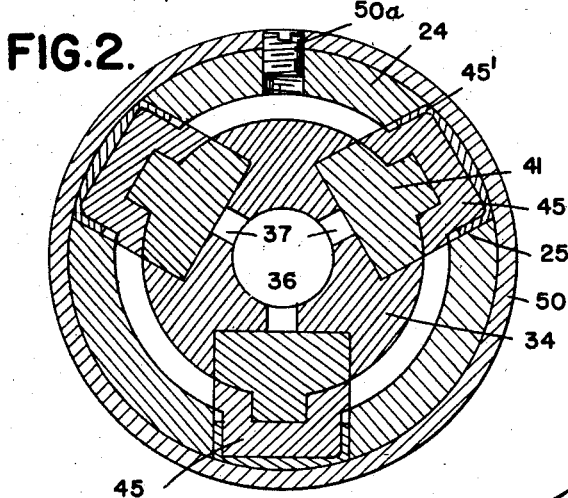
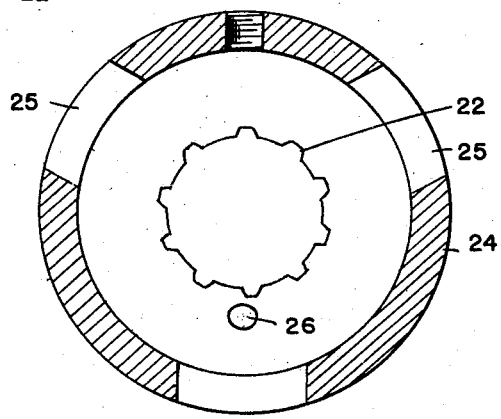
INVENTOR
ANTON F. GREINER
BY
ATTORNEYS

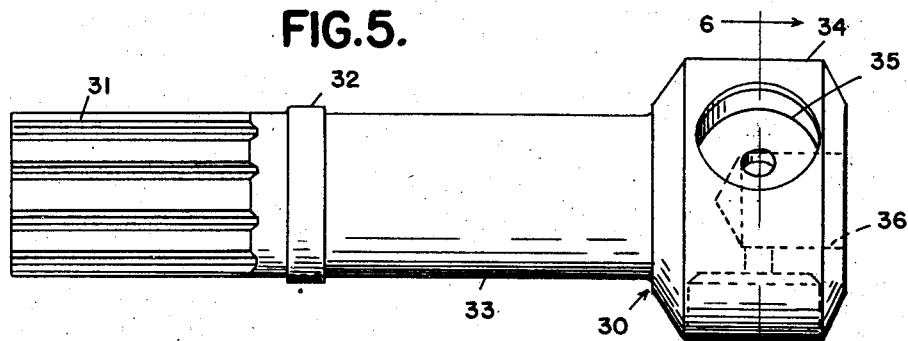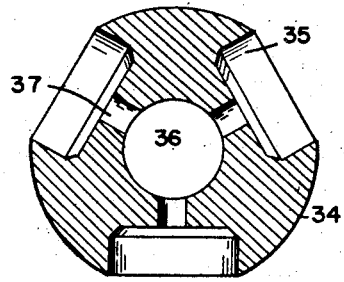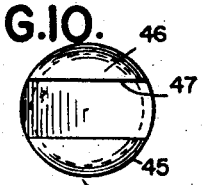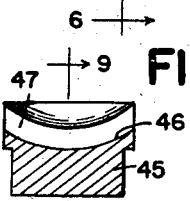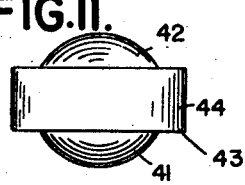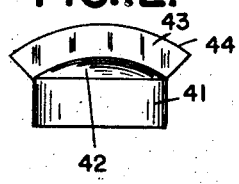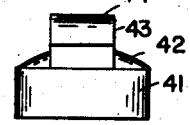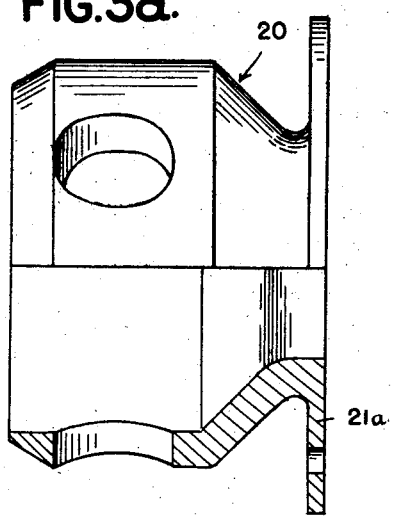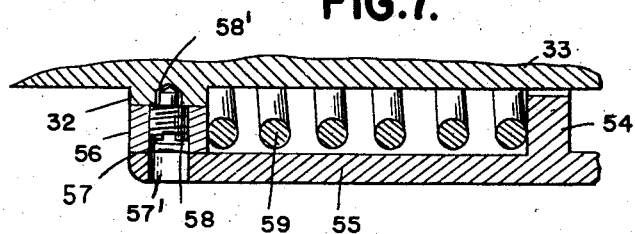

Patented July 16, 1940

2,207,980

UNITED STATES PATENT OFFICE 2,207,980

UNIVERSAL JOINT

Anton F. Greiner, Detroit, Mich.

Application July 31, 1937, Serial No. 156,803

9 Claims. (Cl. 64—21)

This invention relates to universal joints and more particularly to universal joints which give constant velocity ratio at comparatively wide angles of deflection.

It is an object of the invention to produce a universal joint of extreme ruggedness and simplicity which nevertheless retains the advantages of the more complicated structures now known to the art.

It is a further object of the present invention to produce a universal joint of the type described in which the major elements may be cast, forged or pressed, and in which the machining work required to finish the joint may be kept at a minimum.

A further object of the invention is to provide a universal joint in which the necessity for machining a large spherical housing and/or body is eliminated.

It is a further object of the invention to provide a universal joint in which the major female element is unitary as opposed to the conventional form in which said member is formed in two or more parts.

A further object of the invention is to provide a universal joint of the type described with a minimum number of parts.

It is a further object of the invention to provide a universal joint of the type herein disclosed which may be manufactured at a cost materially less than heretofore possible.

It is a further object of this invention to produce a universal joint which may be assembled complete, packed with lubricant and sealed up permanently before leaving the factory.

Other objects and advantages of the present invention will be apparent from the following detailed description and from the illustrative embodiment of the invention in the accompanying drawings in which Fig. 1 is a side elevation of the assembled joint with parts broken away to show the assembly;

Fig. 2 is a section on the line 2—2 of Fig. 1;

Fig. 3 is a detail side elevation of the torsion ring partly in section;

Fig. 3a is a side elevation of a modified form of torsion ring partly in section;

Fig. 4 is a section on the lines 4—4 of Fig. 3;

Fig. 5 is a detail side elevation of the main shaft member;

Fig. 6 is a section on the line 6—6 of Fig. 4;

Fig. 7 is an enlarged sectional detail of the means for attaching the cover member to the main shaft;

Fig. 8 is an axial section of one of the outer cylindrical key members;

Fig. 9 is an axial section of the key member shown in Fig. 8 taken on the lines 9—9 of Fig. 8;

Fig. 10 is a top elevation of the key member shown in Fig. 8;

Fig. 11 is a top elevation of the cooperating male key member;

Fig. 12 is a front elevation of the key member shown in Fig. 11;

Fig. 13 is an elevation of the key member shown in Fig. 11 taken 90° from the side elevation of Fig. 12;

Fig. 14 is a section of the outer and the inner key member in mating position and inserted into the torque ring member and provided with needle bearings instead of ordinary journal bearings and also provided with a locking washer.

My improved universal joint comprises two main members, a torsion ring member 20 and a simple shaft member 30. The torsion ring member 20 comprises the main female part of the joint in which is received the generally upset portion 34 of the shaft member 30.

In universal joints of this type it has been necessary in many constructions to machine the interior of the main female member to a spherical shape with a high degree of accuracy. It has also been necessary to machine the cooperating ball portion to a spherical shape with a high degree of accuracy. Both of these above mentioned machining operations are difficult to accomplish and where they are accurately carried out, add so materially to the cost of the universal joint that at the present time no efficient universal joint of this type is on the market within a reasonable price range.

In my improved universal joint I avoid the necessity for the accurate machining of these large spherical surfaces by means of the construction now to be described. The torsion ring member 20 comprises a cylindrical portion 21 of reduced diameter having standard key ways 22 formed on the interior surface thereof for connection to a shaft. At one end of the cylindrical member 21 the torsion ring member flares outwardly in a generally conical portion 23 to an enlarged diameter. A second cylindrical portion 24 completes the main portion of the one piece torsion ring member. The cylindrical portion 24 comprises the torsion ring proper and is provided with a plurality of circumferentially spaced apertures 25. The outer end of the torsion ring 24 is beveled or tapered as at 27. In the conical portion 23 of the torsion ring member is provided a standard lubricating nipple 26 for charging the interior of the assembled universal joint with lubricant. Instead of cylindrical part 21 with internal keyways, an ordinary flange 21a may be provided as shown in Fig. 3a.

The second major portion of the improved universal joint comprises a male shaft member generally indicated at 30 which has a portion 31 provided with standard key ways for connection to a shaft. An annular collar 32 is provided on the shaft for a purpose which will presently appear. Between the collar 32 and the upset member 34 is provided a cylindrical portion 33. The ball member 34 may be of a roughly round, cylindrical, spherical or conical shape but it is not necessarily machined to exact dimensions. It is sufficient in my improved universal joint that this ball be roughly finished to shape by casting, forging or pressing. In the free end of the spherical ball member 34 I provide a recess 36 and I also provide cylindrical recesses 35 spaced around the periphery of the spherical member 34 in a plane perpendicular to the axis of the shaft 30. The recesses 35 are connected at their bottom to the central recess 36 previously described by small passageways 37 which provide for the flow of lubricant outwardly from the central chamber 36 to the interior of the recesses 35.

The recesses 35 are the same in number and spacing as the apertures 25 formed in the torsion ring 24.

In order to provide for the transmission of torque between the two members just described and at the same time to preserve the necessary angular motion between the parts, I provide cooperating key members 41 and 45 shown in detail in Figs. 8 to 13. These cooperating key members are shown as of generally cylindrical shape, but may be conical, or frustro conical or spherical, and are adapted to be received within the apertures 25 in the torsion ring and within the recesses 35 in the spherical ball member respectively. The key member 45 has an accurately finished concave surface 46, herein shown as spherical, formed at one end thereof and a groove 47 formed in the spherical surface. This member 45 is positioned within the apertures 25 in the torsion ring when the device is assembled. The key members 41 may be generally cylindrical in shape and are provided with an accurately finished convex surface 42, herein shown as spherical, adapted to cooperate and mate with the concave surface 46 of the key members 45. Formed on the convex surface 42 of the key members 41 are flat flanges 43 provided with a curved top surface 44. These flanges are adapted to fit in the slots 47 in the key members 45 and to transmit the torque thereby.

I have illustrated in Fig. 14 the keys 41 and 45 in assembled relation and mounted with needle bearings 46' associated therewith. Where these bearings 46' are employed I prefer to provide a locking washer 47' as shown in Fig. 14. This modification as will be understood, is an alternative to the form in which the key is mounted in a cup bearing.

The relationship between the curved surfaces 42, 46, 44 and the curved bottom of the slot 47, when the device is assembled, is such that all these surfaces are concentric and the center, or line of centers, lies in or passes through the intersection of shafts connected to portion 31 of the upset shaft member, and portion 21 of the torque ring member. In other words, all are concentric with the pivot center of the joint.

A retaining ring 50 is provided which is adapted to retain the members 45 in position in the apertures 25 in the torsion ring. The ring is secured in place by one or more screws 50a (see Fig. 2) threaded into the portion 24 of the member 20. This retaining ring 50 has an inwardly tapering portion 50' which is adapted to be received within a cover member generally indicated at 51. This cover member 51 comprises a cylindrical portion 52 of a diameter sufficient to closely engage the outer periphery of the retaining ring 50. A conical portion 53 connects the cylindrical portion 52 with a second smaller cylindrical portion 55. Substantially at the intersection of the tapered portion 53 and the cylindrical portion 55 I provide an inwardly extending annular flange 54 which is of an inside diameter such that it closely surrounds the periphery of the shaft 33. A plug member 56 is provided which is annular in shape. The inside diameter of the plug 56 is such that it closely engages the flange 32. The plug 56 has a threaded aperture 57 for receiving a screw 58 which is adapted to be received within a suitably tapped aperture 58' in the flange 32.

The assembly of my improved and simplified universal joint will now be explained. Key members 41 are placed within the recesses 35 of the upset portion or member 34. The member 34 with the key members 41 in place is then moved into the open end of the torsion ring 24 and is rotated relative thereto until the key members 41 register with the apertures 25 in the torsion ring. The key members 45 are then introduced into the apertures 25 and are passed therethrough until the flanges 43 are received within the slots 47, then bearing cups 45' or needle bearing 46' and locking washer 47' respectively are inserted. In order to retain the parts in position as so far assembled, the retaining ring 50 is next slipped and locked by screws 50a over the torsion ring, holding bearing cups 45' or needle bearing 46' and locking washer respectively in place. The retaining ring will prevent withdrawal of the key members 45 and will retain the parts as so far assembled in position. The cover member 51 is next slid over the retaining ring 50. I have illustrated at 60 suitable sealing means to be introduced between the cover member 51 and the retaining ring which will prevent the escape of lubricant from my assembled universal joint.

As will be more apparent from an inspection of Fig. 7, the cover member 51 has a flange 54 which closely adjoins the shaft 33. The free end of the cylindrical portion 55 of the cover is spaced from the outside diameter of the flange 32 a distance sufficient to permit the introduction of a coil spring 59 therebetween. After the coil spring has been introduced into the annular space between the portion 55 and the shaft 33, the annular plug 56 is introduced into the opening and closes the same. The cover 51 is then turned relative to the plug 56 until the aperture 57' registers with the screw threaded aperture in the plug 56 and with the hole 58' in the shaft. The screw 58 is then inserted, thereby clamping the ring 56 to the shaft and retaining all of the parts in assembled relation. Subsequently the cover 51 is turned so that the aperture therein no longer overlies the head of the screw 58. A thin metal plate 22' is pressed into the keyed part 22 of body 21.

The assembled device may be filled through nipple 26 with lubricant and is thus permanently sealed.

The operation of my improved universal joint is apparent from the foregoing description. Torque is transmitted from the torsion ring 24 to the key member 45 and bearing 45' and thence through the medium of the slot and groove previously described to the key member 41, which transmits the torque to the upset part 34 of the shaft 30. The spherical shaped portions 46 and 42, when the device is in assembled relation, are concentric with the center of the member 34. Relative rotation of, for example, the shaft 31 about its own longitudinal axis as well as about any axis perpendicular to the first and going to the center of the joint, is provided by these spherical cooperating portions of the key members, and by the fact that said pairs of key members are axially rotatable. The spherical surfaces in my improved universal joint, as has been described, are of relatively small extent and are formed on relatively small detachable pieces which greatly facilitates the manufacture and reduces the expense thereof. The passageways 37 communicating with the central chamber 36 of the ball member permit lubricant to flow from the central chamber outwardly to the recesses in which the key members 41 are received. This insures constant lubrication of these key members which, as will be apparent, also may serve as bearing members. Lubricant also flows from chamber 36 to lubricate members 45 and the contacting surfaces of the members 41 and 45 or needle bearings 46' respectively.

While I have illustrated and described various preferred embodiments of my invention, it will be apparent to those skilled in the art that various additions, omissions, substitutions and modifications may be made within the scope of my invention, as indicated by the appended claims.

What I claim as my invention is:

1. A universal joint comprising an annular torsion female member, apertures through said torsion member, a male member received within said torsion member, recesses in said male member registering with the apertures through said torsion member, means connecting said torsion member and said male member, said means comprising a plurality of bodies extending through said apertures, a plurality of bodies seated in said recesses, cooperating tongues and grooves on said bodies, said tongues and grooves having curved surfaces concentric with the pivot point of the joint.

2. A universal joint comprising an annular torsion member, apertures through said torsion member, an enlarged member received within said torsion member, recesses in said enlarged member registering with the apertures through said torsion member, means connecting said torsion member and said enlarged member, said means comprising a plurality of bodies extending through said apertures, a plurality of bodies seated in said recesses, cooperating tongues and grooves on said bodies, said tongues and grooves having curved surfaces concentric with the pivot point of the joint, and a retaining ring closely surrounding said torsion member and holding said bodies in said apertures.

3. In a universal joint, a torsion ring, apertures through said ring, torque transmitting bodies extending through said apertures and presenting inwardly concave concentric curved surfaces, convex means engaging said concave surfaces in pivotal relation, said surfaces being provided with torque transmitting portions, and a retaining ring surrounding said torque ring and holding said bodies in assembled relation.

4. In a universal joint, a shaft, a flange on said shaft, a cover member having an inwardly extending annular flange closely surrounding said shaft, and a tubular portion surrounding said shaft but spaced therefrom to provide a spring housing, said tubular portion being spaced from said first mentioned flange a distance sufficiently great to accommodate said spring, a plug adapted to close the space between said first mentioned flange and said tubular portion, and means for securing said plug to said shaft.

5. In a universal joint, a shaft, a flange on said shaft, a cover member having an inwardly extending annular flange closely surrounding said shaft, and a tubular portion surrounding said shaft but spaced therefrom to provide a spring housing, said tubular portion being spaced from said first mentioned flange a distance sufficiently great to accommodate said spring, a plug adapted to close the space between said first mentioned flange and said tubular portion, and means for securing said plug to said shaft, said means comprising a screw and a rotatable portion with means adapted to provide access to said screw in one position, and to conceal said screw in a rotated position.

6. A permanently sealed universal joint comprising a housing including a cover member, resilient means urging said cover to closed position, an abutment for said resilient means, securing means for locking said abutment in place, and means movable with said cover for concealing said securing means.

7. A universal joint comprising a pair of coupling members having a portion of one member extending into a portion of the other member, means for pivotally connecting said members in torque transmitting relation, comprising pairs of cooperating key elements spaced from each other circumferentially of the members, one element of each pair being mounted on one of the members and the cooperating element of each pair being mounted on the other member, said elements of each pair having interfitting portions cooperating with each other to transmit torque from one member to the other, and said interfitting portions having contacting surfaces concentric with the pivot point of the joint to provide for relative pivotal movement of the members.

8. A universal joint having a predetermined pivot point and comprising a ball member with a surface concentric to the pivot point, a socket member adapted to receive the ball member, torque transmitting means interconnecting the ball and socket members, said torque transmitting means comprising cooperating pairs of elements spaced from each other circumferentially of the pivot point of the joint and the elements of each pair respectively secured to the ball and socket members, one of the elements of each pair having a groove therein extending longitudinally of the axis of said members passing through the pivot point of the joint and having the base of the groove concentric with said pivot point, and the other of the elements of each pair having a key extending into the groove to transmit torque from one of the members to the other member and having the outer surface engageable with the base of the groove in the first element and also concentric with the pivot point of the joint to provide for relative pivotal movement of the members about said point.

9. A universal joint comprising a pair of coupling members having a portion of one member extending into a portion of the other member, torque transmitting means interconnecting the members and providing for relative universal movement of the members about a common pivot point, said torque transmitting means comprising a plurality of pairs of pivot elements spaced from each other around the axes of the coupling members, one element of each pair supported on one coupling member for oscillation and the cooperating element of each pair supported on the other coupling member, the axes of said elements intersecting the common pivot point aforesaid and the contacting surfaces of the elements of each pair being concentric with said common pivot point, a key extending from one element of each pair into a groove of the cooperating element of each pair, said keys and grooves extending generally longitudinally of the axes of the coupling members and oscillatingly engaging each other to transmit torque from one coupling member to the other at various angles between the axes of the two coupling members.

ANTON F. GREINER.